Figure 1:
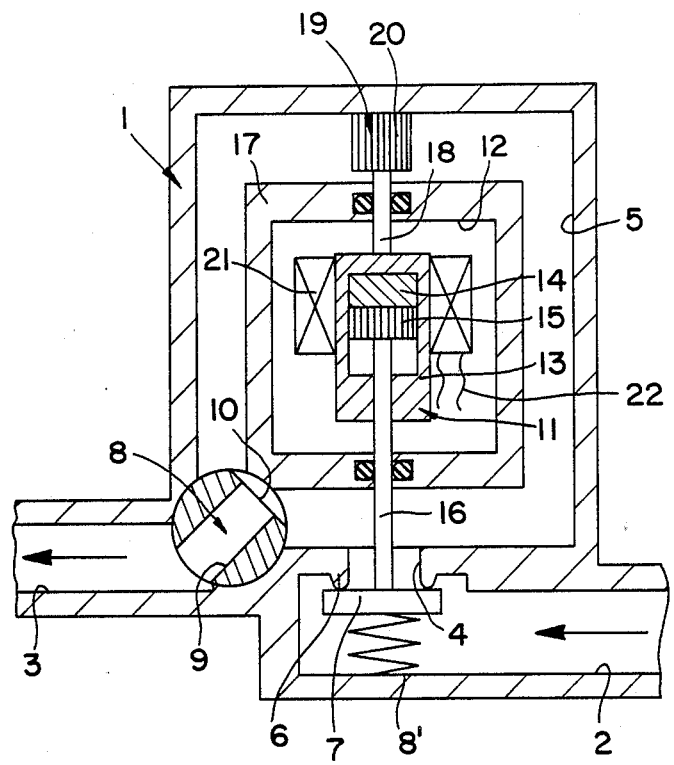

United States Patent [19]

Gruber

[11] Patent Number: 4,911,400
[45] Date of Patent: Mar. 27, 1990

[54] ELECTRICALLY OPERATED VALVE

[75] Inventor: Walter Gruber, Stuttgart, Fed. Rep. of Germany

[73] Assignee: Hansa Metallwerke AG, Stuttgart, Fed. Rep. of Germany

[21] Appl. No.: 396,966

[22] Filed: Aug. 22, 1989

[30] Foreign Application Priority Data

Sep. 2, 1988 [DE] Fed. Rep. of Germany ....... 3829830

[51] Int. Cl.$^4$ ...................... F03G 7/06; F16K 31/02; F16K 31/64
[52] U.S. Cl. ...................................... 251/11; 60/527; 60/528
[58] Field of Search ................ 236/68 B, 68 C, 99 K; 60/527, 528; 251/11

[56] References Cited

U.S. PATENT DOCUMENTS

| 2,989,281 | 6/1961 | Fritts ...................................... 251/11 |
| 3,108,616 | 10/1963 | Ray ........................................ 60/527 |
| 3,275,033 | 9/1966 | Kozel et al. ......................... 137/613 |
| 3,335,997 | 8/1967 | Sherwood ............................ 251/11 |
| 3,381,701 | 5/1968 | Sherwood et al. .................. 251/11 |
| 3,540,479 | 11/1970 | Thompson ............................ 251/11 |
| 3,650,505 | 3/1972 | Drexel .................................... 251/11 |
| 3,721,421 | 3/1973 | Cliff ........................................ 251/11 |
| 3,860,169 | 1/1975 | Norman ................................ 251/11 |
| 4,096,993 | 6/1978 | Behr ...................................... 251/11 |

FOREIGN PATENT DOCUMENTS 2055067 3/1972 Fed. Rep. of Germany .
3707337 10/1987 Fed. Rep. of Germany .

Primary Examiner—George L. Walton
Attorney, Agent, or Firm—Fred Philpitt

[57] ABSTRACT

In an electrically operated valve, a valve closure member, which lies in the path between the inlet channel and the outlet channel, is connected to an expansion member. At the time of electrical heating, the expansion member lifts the valve closure member from the associated valve seat, due to which the path for the flowing medium is cleared. A cooling member is located in an annular channel, into which, controlled by a regulating valve, different quantities of flowing medium can be introduced. The cooling member is thermally coupled to the expansion member. In this way, the expansion member, according to the position of the regulating valve, can be cooled to different degrees, due to which the response behaviour of the valve is variable in particular after switching-off the electric current.

5 Claims, 1 Drawing Sheet

ELECTRICALLY OPERATED VALVE

The invention relates to an electrically operated valve for controlling a flowing medium, in particular sanitary valve, with (a) a housing, which comprises an inlet channel and an outlet channel;
(b) a valve closure member, which cooperates with a valve seat located in the flow path between the inlet channel and the outlet channel;
(c) an adjusting device for the valve closure member, which comprises an electrically heated expansion member, which is connected to the valve closure member;
(d) a cooling member, which is thermally coupled to the expansion member.

Electrically operated valves, by which a flowing medium in particular water, is controlled, are in most cases solenoid valves. For their use—at all events in the sanitary area—a so-called anticipatory control is normally necessary, which necessitates small pilot orifices. These orifices of small dimensions are inclined towards calcification, due to which the entire valve may be put out of operation. Furthermore, it is difficult to control the dynamic response behavior of such solenoid valves so that when used in the sanitary area, water-hammering in the connected domestic pipe system can be avoided.

DE-OS 37 07 337 discloses an electrically operated valve of the afore-mentioned type. In this case, the opening force for the valve closure member is derived from an expansion member, which is heated electrically: when the wax contained in the expansion member is heated, then a pressure pin leaves the expansion member, by which the valve closure member can then be lifted either directly or indirectly from the associated valve seat. If the electric current is disconnected, then the heat still contained in the wax filling of the expansion member must be dissipated. In the known valve, this takes place by way of a cooling plate, which is in heat exchange with the ambient air. However, since the ambient air may have different temperatures and in addition the cooling effect can be influenced by uncontrollable flow conditions of the ambient air, the response behavior of the known valve after switching-off the current, thus the closing characteristic, is largely undefined.

It is the object of the present invention to develop an electrically operated valve of the afore-mentioned type so that a definite response behaviour is guaranteed, in particular during the closing process.

This object is achieved according to the invention due to the fact that (e) the cooling member is disposed downstream of the valve seat in or on a channel, through which the flowing medium can flow.

In the development of the electrically operated valve according to the invention, the expansion member is thus no longer cooled by the ambient air, but by the flowing medium itself. The latter comprises—in any case in the area of use provided for the invention—a virtually constant temperature, so that the temperature difference between the cooling member and the cooling, flowing medium, is no longer left to chance. Due to the fact that the cooling member is disposed downstream of the valve seat in the flow path of the flowing medium, only the decay behaviour, thus the behaviour after switching-off the current, and only to a smaller extent the response behaviour can be influenced by the cooling effect when opening the valve. This is once more a desired characteristic for the example of application in question.

In a particularly advantageous embodiment of the invention, the cooling member is disposed in a branch path of the flowing medium, the proportion of the medium flowing into the branch path being able to be adjusted by a regulating valve. If a relatively large quantity of flowing medium is introduced into the branch path, then the cooling effect on the cooling member and thus on the expansion member is correspondingly greater. The heat still contained in the wax filling after switching-off the electrical current is dissipated relatively quickly in this way, so that the wax filling may contract quickly. The valve closure member is then quickly returned to its closing position. On the other hand, if only a relatively small quantity of flowing medium is allowed into the branch path, its cooling effect is relatively weak; it then requires a comparatively long time until the expansion member has cooled and the valve closure member has thus once more returned to its closing position. By adjusting the regulating valve, the closing characteristic of the valve can thus be determined in a simple manner, due to which, particularly adapted to local conditions, the occurrence of water-hammering can be prevented at the time of closing of the valve.

The branch path may be an annular channel in the housing, which can be produced geometrically and simply from a manufacturing point of view.

In this case, once more for geometric reasons, it is recommended that the expansion member is located in a dry cavity, around which the annular channel is guided.

The cooling member may have a surface enlarged by corrugations and may be thermally coupled by way of a rod to the expansion member.

One embodiment of the invention is described in detail hereafter with reference to the drawings; the single figure shows diagrammatically an electrically operated water valve, in section.

The water valve illustrated comprises a housing 1 with a water inlet channel 2 and a water outlet channel 3. The inner end of the water inlet channel 2 is connected by way of a bore 4 to an inner annular channel 5. A valve seat 6 is formed at the point where the bore 4 opens into the water inlet channel 2, which valve seat 6 cooperates with a valve closure member 7. The valve closure member 7 is pressed by a compression spring 8', against the valve seat 6, so that the bore 4, which forms the passage from the water inlet channel 2 into the annular channel 5, is normally closed.

The water admitted to the annular channel 5 is divided into two streams by a rotary regulating valve 8. In all rotary positions of the regulating valve 8, the main part of the water flows by way of an inner channel 9 to the water outlet channel 3. A second part of the water stream is guided by the regulating valve 8 by way of a recess 10 into the annular channel 5, this second part of the water stream now depending greatly on the rotary position of the regulating valve 8. The purpose of this measure will become clear hereafter.

The valve closure member 7, which ultimately controls the water stream between the water inlet channel 2 and the water outlet channel 3, is actuated by an expansion member 11, as it is known in its basic construction from sanitary thermostatic valves. It is disposed in a cavity 12 inside the annular channel 5. The cavity 12 is dry, thus water does not flow therein.

In known manner, the housing 13 of the expansion member 11 contains a filling 14 of wax with a high coefficient of thermal expansion, which acts on a piston 15. The piston 15 is connected to the valve closure member by way of a piston rod 16, which is guided axially through the housing 13 of the expansion member 11 and—in a sealed manner through the wall 17 between the annular channel 5 and the inner cavity 12 of the housing, 1.

A further rod 18 also passes through the wall 17, likewise in a sealed manner, which rod 18 provides thermal coupling of the housing 13 of the expansion member 1 to a cooling member 19. The cooling member 19 provided with a high surface by corrugations 20 is acted upon by the water flowing through the annular channel 5.

Finally, the housing 13 of the expansion member 11 is surrounded coaxially by an electrical coil 21, whereof the supply leads 22 are guided in a suitable manner out of the housing 1 towards the outside.

The method of operation of the above-described water valve is as follows: normally, thus when there is no supply of current to the coil 21, the valve closure member 7 bears against the valve seat 6 under the action of the compression spring 8'. The passage of water between the water inlet channel 2 and the annular channel 5, thus also the water outlet channel 3, is blocked; the valve is closed.

If it is intended to open the valve, current is supplied to the coil 21. The developing heat causes an expansion of the wax filling 14 in the expansion member 11, due to which its piston 15 is slid downwards. This movement is transmitted by way of the piston rod 16 to the valve closure member 7, which lifts off the valve seat 6. Water can now flow from the water inlet channel 2 into the annular channel 5, from there by way of the inner channel 9 of the regulating valve 8 into the water outlet channel 3.

Furthermore, according to the rotary position of the regulating valve 8, a certain proportion of water flows through the annular channel 5 and thus acts on the cooling member 19.

If the valve is to be re-closed, the supply of current to the coil 21 is terminated. The wax filling 14 of the expansion member 11 cools down, which is accompanied by a corresponding reduction of volume. Under the influence of the compression spring 8', the valve closure member 7 is moved towards the valve seat 6 and thus at the same time the piston 15 in the drawing is moved upwards within the housing 13 of the expansion member 11. The flow of water between the water inlet channel 2 and the water outlet channel 3 stops.

The time lag by which the valve closure member 7 reacts to the switching-off of the current flowing through the coil 21, depends on the cooling of the expansion member 11. The latter is in turn dependent on how much water flows through the annular channel 5 and may act on the cooling member 19.

If a rapid closure of the valve is desired after switching-off the current, the regulating valve 8 is rotated into such a position in which a relatively large proportion of the water stream enters the annular channel 5. This relatively great water stream then cools the cooling member 19 relatively intensively, so that the heat in the wax filling 14 of the expansion member 11 is quickly dissipated after the end of the flow of current through the coil 21. Thus, the inertia of the valve at the time of closing is relatively slight in this rotary position of the regulating valve 8.

If, conversely, a relatively slow response of the valve is desired at the time of closing, the regulating valve 8 is brought into such a rotary position in which there is only a slight flow through the annular channel 5. This means that the cooling member 19 is only cooled relatively little. After the termination of the flow of current through the coil 21, the heat content of the wax filling 14 is thus dissipated only relatively slowly, so that the resetting of the valve closure member 7 takes a relatively long time.

The rotary position of the regulating valve 8 has only a slight influence on the starting behaviour of the valve, since at the beginning of opening, there is not yet any flow through the annular channel 5. The tendency is that the conditions are exactly the reverse of those at the time of closing: in the case of intensive cooling of the cooling member 19, thus when there is a relatively great flow through the annular channel 5, the response behaviour is relatively sluggish when current flows through the coil 21, since the thermal equilibrium is only achieved later due to the high dissipation of heat. Conversely, the piston 15 of the expansion member 11 follows the supply of current to the coil 21 relatively quickly, if there is only a slight flow through the channel 5.

With the valve described, different response characteristics may thus be achieved by selecting the rotary position of the regulating valve 8. In particular it is possible to achieve gentle closing of the valve, due to which water-hammering can be avoided.

I claim:

1. Electrically operated valve for controlling a flowing medium, in particular sanitary valve, with
   (a) a housing, which comprises an inlet channel and an outlet channel;
   (b) a valve closure member, which cooperates with a valve seat located in the flow path between the inlet channel and the outlet channel;
   (c) an adjusting device for the valve closure member, which comprises an electrically heated expansion member, which is connected to the valve closure member;
   (d) a cooling member, which is thermally coupled to the expansion member, characterized in that the cooling member (19) is disposed downstream of the valve seat (6) in a channel (5), through which the flowing medium may flow, said cooling member (19) being disposed in a branch path of the flowing medium in the channel, the proportion of the medium flowing into the branch path and in contact with said cooling member (19) being adjustable by a regulating valve (8), thereby controlling the degree of cooling of said heat expansion member to determine the rate of closing of said valve closure member.

2. Valve according to claim 1, characterized in that the branch path comprises an annular channel (5) in the housing (1).

3. Valve according to claim 2, characterized in that the expansion member (11) is located in a dry cavity (12), around which the annular channel (5) is disposed.

4. Valve according to claims 1, characterized in that the cooling member (19) has a surface enlarged by corrugations (20).

5. Valve according to claims 1, characterized in that the cooling member (19) is thermally coupled to the expansion member (11) by way of a rod (18).

* * * * *